United States Patent [19]

Peters

[11] Patent Number: 5,162,655
[45] Date of Patent: Nov. 10, 1992

[54] APPARATUS FOR CALIBRATING RADIOACTIVE DETECTION INSTRUMENTS UTILIZING A BETA-RAY SOURCE WITHIN AN ALUMINUM MASS

[76] Inventor: Gerald L. Peters, 1307 Martinique Dr., Augusta, Ga. 30909

[21] Appl. No.: 683,827

[22] Filed: Apr. 11, 1991

[51] Int. Cl.⁵ .............................................. G21F 5/02
[52] U.S. Cl. ............................ 250/496.1; 250/497.1; 250/498.1; 250/252.1
[58] Field of Search ............... 250/496.1, 252.1, 506.1, 250/497.1, 498.1

[56] References Cited

U.S. PATENT DOCUMENTS

| | | | |
|---|---|---|---|
| 2,820,905 | 1/1958 | Schloss | 250/388 |
| 3,697,755 | 10/1972 | Boissevain et al. | 250/496.1 |
| 3,944,822 | 3/1976 | Dzubay | 250/272 |
| 4,267,445 | 5/1981 | Cabbiness et al. | 250/255 |
| 4,406,947 | 9/1983 | Burton et al. | 250/252.1 |
| 4,513,204 | 4/1985 | Domnanovich et al. | 250/496.1 |
| 4,524,279 | 6/1985 | Christianson et al. | 250/497.1 |
| 4,587,623 | 5/1986 | Regimand et al. | 364/571 |
| 4,791,656 | 12/1988 | Pratt, Jr. et al. | 378/89 |
| 4,980,904 | 12/1990 | Sones et al. | 378/207 |
| 5,032,719 | 7/1991 | Gleason et al. | 250/252.1 |

FOREIGN PATENT DOCUMENTS 2360869 3/1978 France .
0984834 3/1965 United Kingdom .

*Primary Examiner*—Jack I. Berman
*Assistant Examiner*—James Beyer
*Attorney, Agent, or Firm*—Laurence R. Brown

[57] ABSTRACT

Apparatus for calibrating radiation detection instruments retains a beta radiation source, typically strontium 90, providing a known intensity of beta radiation in a safety shielded position within an aluminum mass to meter out standard doses in a plurality of ranges for calibrating corresponding instrument ranges. Safety features assure shielding of the radiation to prevent any exposure of personnel calibrating instruments to radiation. The calibrating apparatus is portable, but is supplied also in a wall mount housing structure with a horizontally extending shelf for receiving an instrument into calibration position. A pivotable treadle must be operated when placing the instrument into calibration position in order to release calibrating radiation from the source, which is retained in a safe storage position when the calibrating apparatus is not in use.

11 Claims, 2 Drawing Sheets

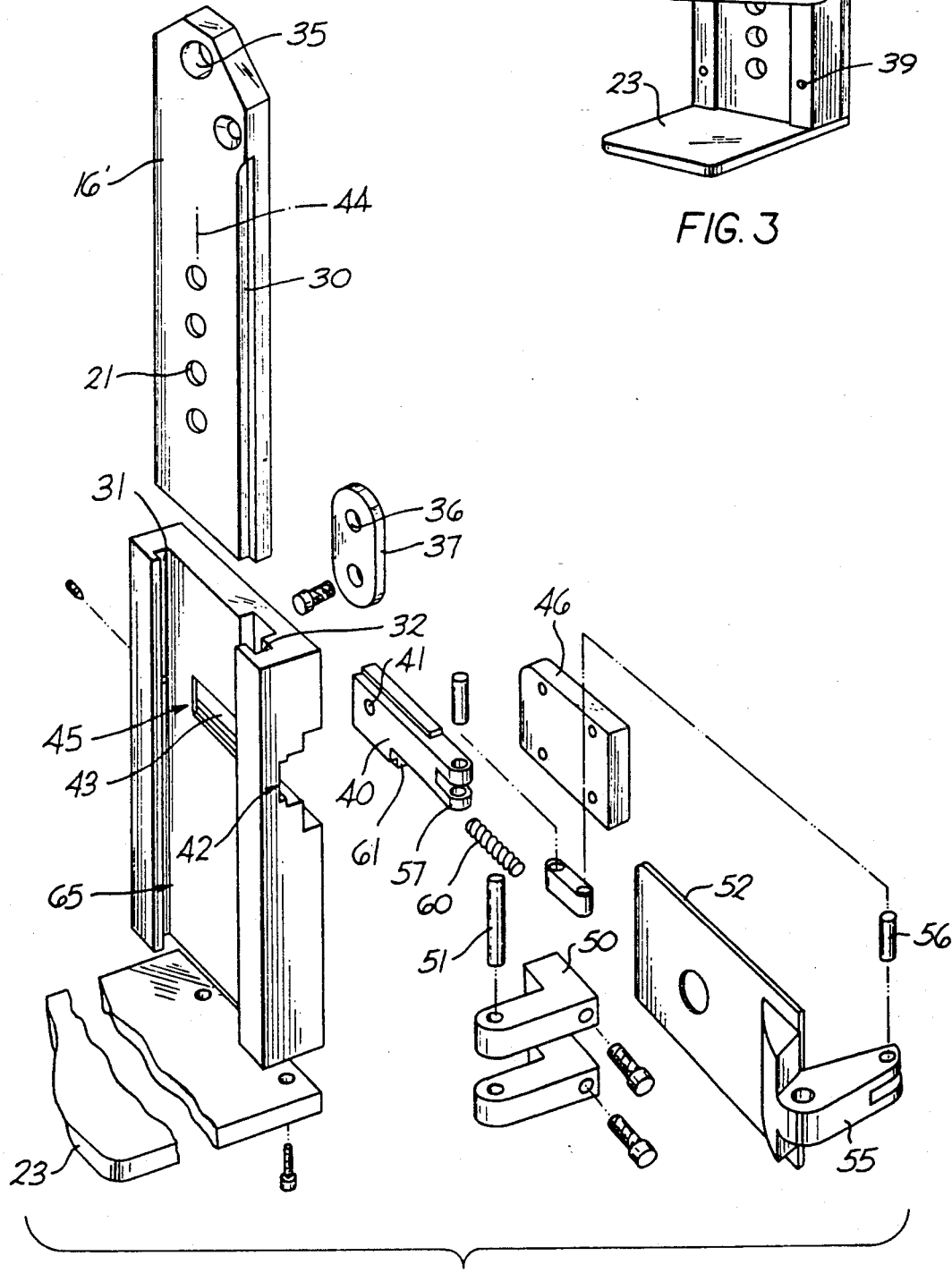
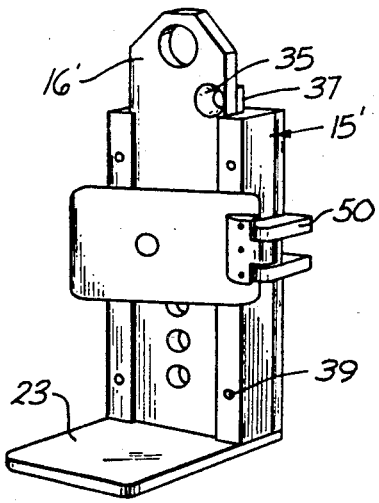
FIG. 3
FIG. 4

APPARATUS FOR CALIBRATING RADIOACTIVE DETECTION INSTRUMENTS UTILIZING A BETA-RAY SOURCE WITHIN AN ALUMINUM MASS

TECHNICAL FIELD

This invention relates to radioactive detection instruments and more particularly it relates to calibrating apparatus for such instruments.

BACKGROUND ART

Portable electronic instruments used for radiation detection have calibrating adjustments to align electronic components and meter readings, which should be calibrated frequently in view of potential changes of battery and electrical component tolerances. However under usual conditons encountered in the field, convenient portable calibration apparatus is not available, primarily because of the possible exposure of unskilled operators to radiation damage. However, if an instrument is not in calibration, erroneous readings could impose significant damage. Thus, it is an objective of this invention to provide an improved, convenient to use, calibrating apparatus that can be used safely in the field without skilled operators, and which is small and portable.

Calibrating apparatus for radiation sensing instruments is known in the prior art, as exemplified by British Specification 37758/62 published Mar. 3, 1965 by K. E. G. Perry for Improvements in or relating to Calibration Device for Calibrating Radiation Sensitive Instruments. A portable or wall mounted instrument is provided using a beta radiation source with an adjustable calibrated shutter detented at several positions for exposing the radiation source at different radiation intensities for calibrating different instrument detection ranges, by means of holes of different sizes. A beta source is used to reduce the amount of shielding required for a gamma radiation source. This instrument however cannot safely be used in the field with untrained personnel because fo the direct exposure of personnel using the device to the radiation from the source which is directed outwardly into the environment and toward persons using the device for calibration through the calibration holes. Also there is no provision in the apparatus for preventing the beta source from converting the beta radiation to harder X-Ray or gamma radiation, as will be explained in more detail hereinafter.

U.S. Pat. No. 2,820,905, Jan. 21, 1958 to B. Schloss for Radiation Detector Calibration is also deficient in safety measures in that a radium bromide radiation source is contained within the instrument for manual transfer to the carrying handle for calibration and therefore must be handled during calibration without protection of the calibrating personnel or the surrounding environment from radiation.

French publication 2,360,869, Mar. 3, 1978 provides wall mounted calibration apparatus with a gamma source in a thick walled lead housing which however radiates into the environment towards a person calibrating an instrument through calibrated windows in doors, which are manually opened.

This invention is directed toward the provision of safe and secure calibration apparatus that does not expose personnel or the environment to the dangers of radiation.

DISCLOSURE OF THE INVENTION

A calibration source of beta radiation, such as Strontium 90, is confined in a protective aluminum vault to prevent radiation into the environment and toward personnel using the apparatus to calibrate radiation instruments. This vault in essence is opened at least in part through a calibrated and detented shutter carrying calibrated lenses for several calibration ranges. The aluminum vault and protective mass surrounding the radiation source and contained in the shutter mechanism is pertinent in the prevention of conversion of beta radiation to harder X-ray and gamma ray radiation through the Bremstrahling effect, thus allowing calibration at higher intensity ranges from the beta source without radiation danger to operating personnel or the environment.

Further safety features include mechanisms for retaining the shutter in a resident non-use position which blocks the escape of radiation from the source out of the storage vault. Insertion of an instrument to be tested into calibration position therefore can automatically move the shutter out of its safety position. Other embodiments provide alternative structure for protection of the environment in resident storage position when an instrument is not being calibrated.

Two embodiments of the invention provide respectively for a linearly movable shutter panel of generally rectangular configuration and a rotary movable panel of generally circular configuration. Calibrating lens structure is formed into aluminum panels of great enough thickness to prevent any substantial radiation from the source and thus providing a radiation blocking member in one registration position for storage that prevents radiation release into the environment. The thickness of the panel is decreased in calibrated amounts at other registration positions for passing a radiation intensity from the source of a predetermined magnitude for calibrating different instrument ranges.

Other features, advantages and objectives of the invention will be found throughout the following description and claims particularly with reference to the accompanying drawing.

BRIEF DESCRIPTION OF THE DRAWING

In the drawing, wherein like reference characters are used in the various views for similar features to facilitate comparison, and primed reference characters indicate different species of the respective features:

FIG. 3 is a perspective sketch of a further embodiment of the calibrating apparatus with a linearly movable calibration shutter mechanism, and FIG. 4 is an exploded view of the latter embodiment.

THE PREFERRED EMBODIMENTS

Figure 2:
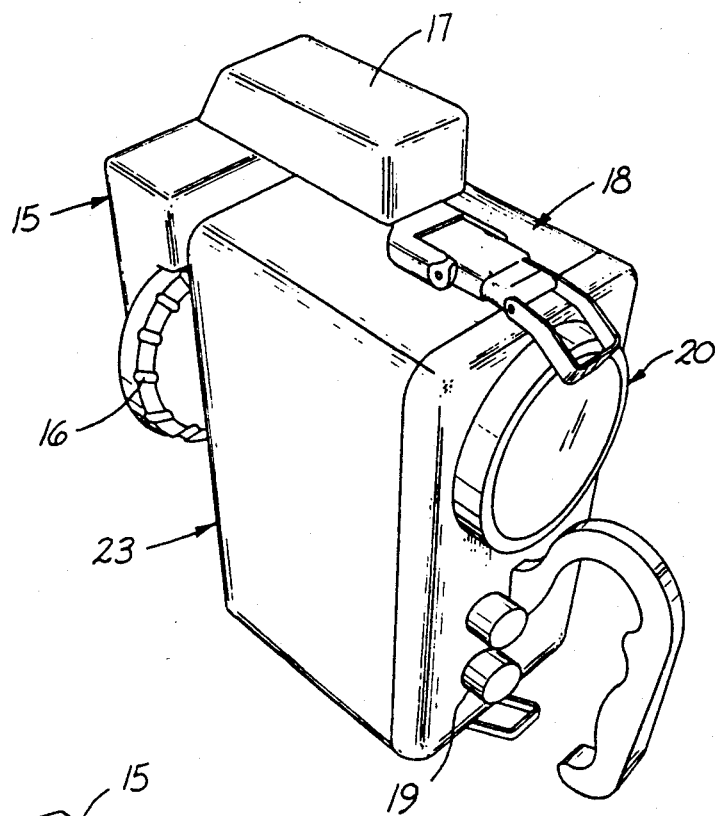
FIG. 2 is a perspective view of the calibrating apparatus with a radioactive detection instrument in calibrating position.
Figure 1:
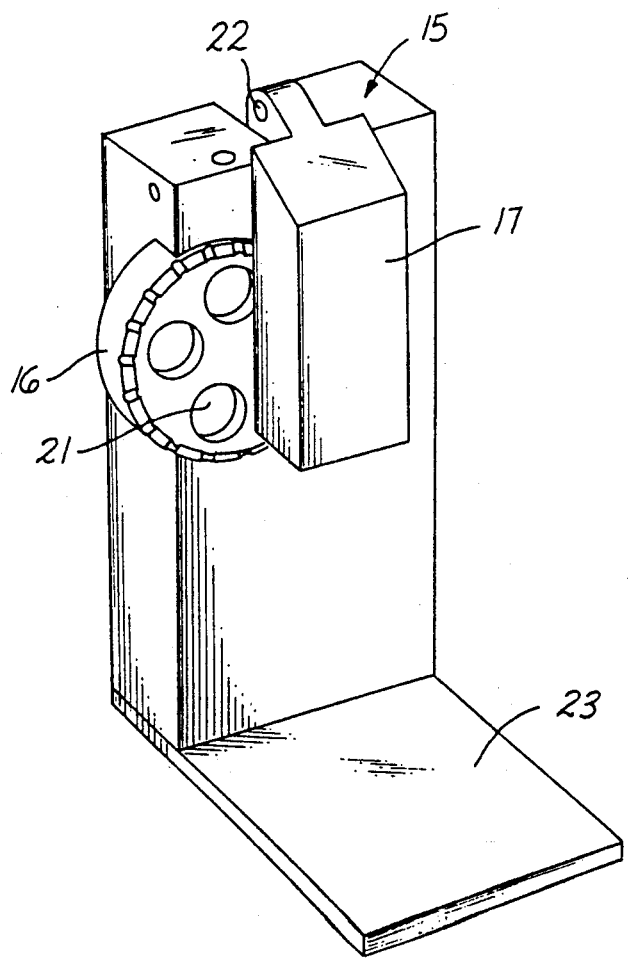
FIG. 1 is a perspective sketch of a portable or wall mount embodiment of the calibrating apparatus provided by this invention in which a rotatable detented shutter provides a choice of several calibrating radiation intensities adapted for different instrument ranges.

In the embodiment of FIGS. 1 and 2, the housing 15, multiple range shutter 16 and safety cap 17 are all made from aluminum or an aluminum alloy that minimizes the Bremstrahlung effect, so that the beta radiation source contained in the housing does not tend to produce hardened radiation. For that reason, higher intensity beta sources may be safely used to calibrate higher instrument ranges. Thus, for example 50,000 milli-rad per hour meter ranges now found on electronic radioactive detection instruments 18 may be calibrated safely without significant danger to the environment or personnel doing the calibrations.

As may be seen the shutter 16 is a circular aluminum disc panel of a thickness that blocks radiation from the source, mounted for rotation about its axis to present a plurality of lenses 21 at detented positions under the safety cap 17 for transmitting radiation from the inner beta source (not shown), surrounded by enough aluminum mass to constitute a safety storage vault with one escape access opening aligned with the lenses 21 in calibrating position behind safety cap 17. One detented position, now in resident storage position under cap 17, constitutes a panel portion without a lens 21 of reduced panel thickness thereby to block radiation from said source by its mass of aluminum. Each lens 21 is carefully machined to a calibrated depth to reduce the aluminum panel thickness of the shutter 16 enough for presenting a calibration intensity corresponding to one of the ranges available on the instrument 18, which has a range selection knob 19 and indicating meter 20. The knurling on the knob facilitates manual selection of a desired detent position. Preferably the disc is spring biased or otherwise constructed in a manner such as later discussed to return automatically after use to the storage radiation blocking selection.

As may be seen in FIG. 2, the safety cap is pivoted about pin 22 to permit the instrument 18 to be positioned for receiving radiation in a registered position on its rear panel 23 by resting on the shelf or ledge 23 with the cap 17 in a horizontally disposed position. The cap is either spring or gravity biased to return upon removal of instrument 18 to its storage position (FIG. 1) tightly sealing the radiation exit path to prevent any low level radiation that might escape through fitting tolerance gaps in the internal mechanisms or structure of the calibrating apparatus housing.

The internal structure within housing 15 can be better understood by reference to the embodiment of FIGS. 3 and 4 in which the primary difference is that the shutter mechanism is the generally rectangular slide plate 16' that linearly moves along a vertical axis. Thus, the force of gravity returns the shutter 16 to a resident position where the full thickness of the shutter panel prevents release of radiation. The shutter panel is rabbetted at edge 30 to fit into channel grooves 31, 32 thus to make a circuitous path for exit of stray radiation, thus giving good protection against radiation leakage.

As a security measure, mating apertures 35, 36 in the shutter 16' and housing backside bracket 37 provide means for padlocking the shutter in its storage non-use position. The mounting apertures 39 permit a wall mount position.

For greater security to the environment and personnel in the non-use storage condition, a shuttle 40 is provided for moving a beta radiation source behind the escape opening 41 back and forth in the groove 42. In a calibrating position inside window 43, when the shuttle is moved to the right, the escape opening 41 is aligned to register with the lenses 21 along the vertical axis 44 of the shutter 16'. In the leftmost position the escape opening 41 is hidden behind the housing panel 45 at the left end of window 43. The shuttle 40 in this case together with the housing panel 45 and the back access plate 46 forms a secure vault for storage of the beta source, which constitutes, for example, a two milli-curie calibrated beta emitter sufficient for high range calibration in a small compact instrument having safe shielding.

Retainer bracket 50, by way of pivot pin 51, pivotally supports the treadle mechanism 52, which at lever arm 55 via pivot pin 56, mates with shuttle fork 57 to move the shuttle 40 back and forth. The compression spring 60 embedded in an aperture of bracket 50 (not shown) to bear against shuttle ledge 61 forces the shuttle 40 to the left and thus pivots treadle 52 outwardly from the calibration surface 65 of the housing 15'. Thus, the beta source is not withdrawn to a position in window 43 until an instrument to be calibrated is pushed against the treadle 52 to pivot it back against front calibrating surface 65 of housing 15' to pivot arm 55 clockwise and move shuttle 40 to the right.

It is thus seen that this invention provides a calibrating system safe to the environment and personnel, which does not require expertise in use, and which is small and portable for use at the site of the radiation detector instruments that significantly improves the state of the art. Thus, those features of novelty relating to the spirit and nature of the invention are set forth with particularity in the following claims.

I claim:

1. Apparatus for calibrating radioactive detection instruments, comprising in combination, a source of beta radiation of known radiation intensity, an aluminum vault for deposit of the source having an escape opening for supplying beta radiation from said source at said known intensity, a shutter member constructed of aluminum containing a plurality of calibrated lenses adapted for positioning in a set of registration positions with said escape opening to release respective beta radiation output streams at a calibrated set of radiation intensities and further presenting a registration position presenting a radiation blocking member for preventing radiation release from said escape opening, an aluminum housing for holding said shutter member and said escape opening in a relatively movable relationship to restrict radiation to that released from said escape opening as processed in said registration positions thereby to provide from said source radiation of different magnitudes at different relative positions of said shutter member and said escape opening only when the shutter member positions and said escape opening are in registration with one of said lenses, and safety means for retaining the shutter member in a resident non-use position with said radiation source, said shutter member blocking said escape opening to prevent release of radiation.

2. The apparatus of claim 1 wherein said shutter member comprises an aluminum panel of a thickness for substantially reducing the escape of radiation from said escape opening and said calibrated lenses comprise regions in said panel of reduced panel thickness for increasing the amount of radiation released from the escape opening.

3. The apparatus of claim 2 wherein said shutter member comprises a longitudinally oriented member for linear movement to present said calibrated lenses in registration with said escape opening.

4. The apparatus of claim 2 wherein said shutter member comprises a substantially circular disc member to rotate about its axis to present said calibrated lenses in registration with said escape opening.

5. The apparatus of claim 1 wherein said housing has structure for retaining a radioactive detection instrument in calibration position to receive radiation escaping from said escape opening.

6. The apparatus of claim 5 further comprising a pivoted member residing in a position interfering with the retention of a radioactive detection instrument in calibration position and operable with an aluminum protective member for relative movement into a position for shielding said escape opening when the instrument is not in calibration position.

7. The apparatus of claim 6 wherein said pivoted member comprises a movable treadle for placing the instrument in calibration position by displacing a shuttle carrying the source from a safe storage position to a position for emitting radiation through said lenses.

8. The apparatus of claim 6 wherein said pivoted member comprises an aluminum shielding member placed in position to block radiation from said source directed toward said escape opening and movable to a calibration position.

9. The apparatus of claim 1 with locking means for retaining the shutter member in a position blocking the escape of radiation from said escape opening.

10. The apparatus of claim 1 wherein said housing has wall mount structure with a horizontally extending shelf for positioning an instrument to be calibrated into a calibration position adjacent said escape opening.

11. Apparatus for calibrating beta ray radioactive detection instruments comprising in combination,
a radioactive beta ray source of known radiation intensity,
shutter means constructed of an aluminum panel containing a plurality of calibrated lenses arranged in said panel in a geometric array for positioning in a corresponding set of registration positions with said radioactive source directing beta ray energy through one of the respective lenses, and
lens structure for said lenses comprising portions of said aluminum panel of calibrated thicknesses, whereby the aluminum prevents conversion of beta rays to harder X-ray and gamma ray radiation.

* * * * *